(12) United States Patent
Albrecht

(10) Patent No.: US 6,543,587 B1
(45) Date of Patent: Apr. 8, 2003

(54) HYDRAULIC BRAKE WITH ELECTRIC PARKING BRAKE

(75) Inventor: James W. Albrecht, Dayton, OH (US)

(73) Assignee: Stromag, Inc., Centerville, OH (US)

(*) Notice: Subject to any disclaimer, the term of this patent is extended or adjusted under 35 U.S.C. 154(b) by 0 days.

(21) Appl. No.: 09/953,998

(22) Filed: Sep. 17, 2001

(51) Int. Cl.[7] ............................................. B60T 13/04
(52) U.S. Cl. .................. 188/171; 188/72.3; 188/106 P; 188/173; 188/216; 188/72.4
(58) Field of Search ................................ 188/171, 72.3, 188/156–165, 72.4–72.6, 216, 173, 106 R, 106 P; 310/77, 93, 103; 192/90; 303/13, 14, 15, 9.76, 71; 187/223, 222; 92/130 A, 130 B

(56) References Cited

U.S. PATENT DOCUMENTS

| | | |
|---|---|---|
| 2,270,417 A | 1/1942 | Cox |
| 2,512,565 A | 6/1950 | Hallander |
| 3,554,335 A * | 1/1971 | Ritter et al. .............. 188/171 |
| 4,175,646 A | 11/1979 | Eikelberger |
| 4,921,076 A | 5/1990 | Grenier et al. |
| 5,368,135 A | 11/1994 | Sallee |
| 5,699,883 A | 12/1997 | Albrecht |
| 5,704,693 A | 1/1998 | Mackiewicz |
| 6,129,184 A * | 10/2000 | Ferrand et al. ............. 188/171 |
| 6,142,266 A * | 11/2000 | Appeldorn et al. ......... 188/171 |

FOREIGN PATENT DOCUMENTS

| | | |
|---|---|---|
| DE | 907229 | 3/1954 |
| DE | 1179628 | 10/1964 |
| EP | 0905402 A3 | 3/1999 |
| EP | 0905402 A2 | 3/1999 |
| FR | 1260659 | 3/1960 |

OTHER PUBLICATIONS

Warner Electric Advertisement entitled Through Innovation the Family of Brakes for Forklift Applications Grows, one page.

* cited by examiner

*Primary Examiner*—Douglas C. Butler
(74) *Attorney, Agent, or Firm*—Bracewell & Patterson, L.L.P.

(57) ABSTRACT

A vehicle brake assembly has a rotor that mounts to a shaft of the vehicle for rotation with it. The rotor has an annular braking surface. A hydraulic piston is non-rotatably mounted to the vehicle. The piston is movable axially relative to the rotor and has a braking surface for frictional engagement with the braking surface of the rotor when hydraulic fluid pressure is supplied to the piston. A coil body having an electromagnetic coil is axially movable relative to the rotor. A coil plate is mounted adjacent the coil body and is attracted to the coil body when electrical power is supplied to the coil. A coil spring is mounted between the coil plate and the coil body. The coil spring moves the coil plate away from the coil body causing braking action when the electrical power is removed from the coil.

15 Claims, 4 Drawing Sheets

HYDRAULIC BRAKE WITH ELECTRIC PARKING BRAKE

TECHNICAL FIELD

The invention relates to a brake unit, particularly for providing manually controlled hydraulic braking action when the vehicle is being driven and automatic electric braking action when the operator leaves the vehicle.

BACKGROUND OF THE INVENTION

Many vehicles, such as fork lifts, require both a manually actuated hydraulic brake while the vehicle is being driven and a security brake which operates automatically when the operator parks and leaves the vehicle. A variety of designs are used. In these designs, generally a switch will sense the departure of the driver from the seat and actuate a solenoid to cause a brake to lock. While workable, it is desired to have a more economical and less complex system.

SUMMARY OF THE INVENTION

A combination hydraulic and electrical parking brake is useful particularly for a forklift. The brake assembly mounts to a spindle or shaft that has a rotor that rotates with the shaft. The brake assembly has nonrotating coil, which when energized, attracts a plate to release the brake. When attracted to the coil, the plate compresses a set of coil springs. As long as electrical power is supplied to the coil, the electrical portion of the brake will not be operating. When electrical power ceases, such as when the driver leaves his seat, the coil springs cause the plate to push frictional pads against the rotor to prevent the rotor and shaft from turning. The brake assembly also has a piston. When hydraulic pressure is applied to the piston, it applies a frictional force to the rotor.

DETAILED DESCRIPTION OF THE INVENTION

Figure 1:
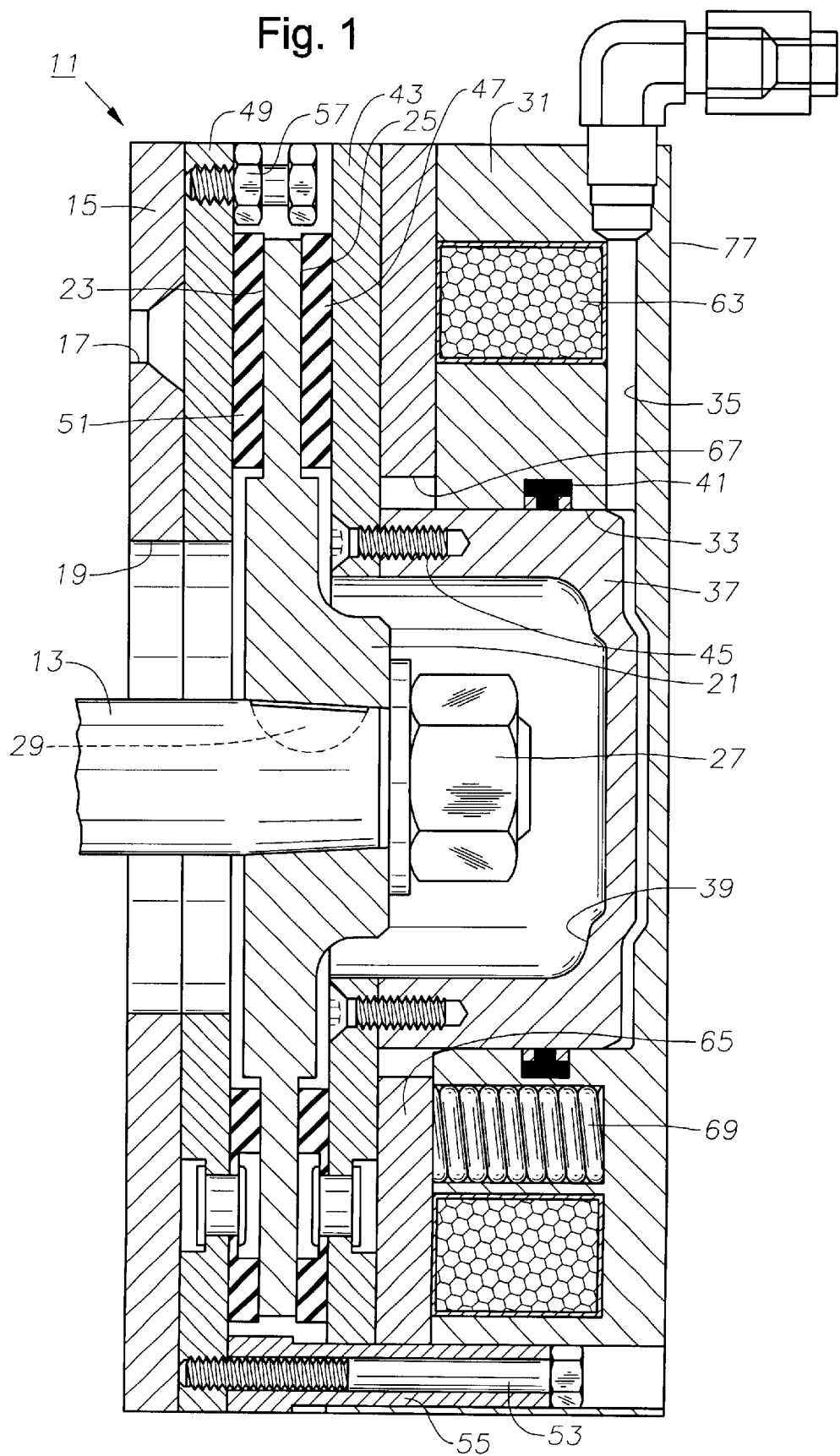
FIG. 1 is a cross-section view taken along the line 1—1 of FIG. 4 and showing an electrical and hydraulic brake assembly constructed in accordance with this invention.

Referring to FIG. 1, brake assembly 11 is configured to mount to a rotatable shaft 13, particularly of a vehicle such as a forklift. Shaft 13 may be an output shaft from a motor or engine or it may be an axle for a wheel. Brake assembly 11 can be mounted to of a variety of types of equipment for selectively stopping rotation of a shaft. A mounting plate 15 will mount to a stationary component of the vehicle. Mounting plate 15 has a plurality of holes 17 (only one shown) for mounting to the vehicle. Mounting plate 15 also has a large central hole 19 through which shaft 13 extends.

A rotor 21 is rigidly mounted to shaft 13 for rotation in unison. In this embodiment, rotor 21 mounts to the end of shaft 13, although in some configurations, it could be mounted between the ends of a shaft. Rotor 21 is a circular disc having a central hub portion and an annular flange extending radially therefrom. The flange has a first brake surface 23 on a side that faces in what is referred to herein as a forward direction, and a second brake surface 25 on the opposite side. Brake surfaces 23, 25 are annular surfaces that extend from the hub portion to the periphery of rotor 21. A nut 27 holds rotor 21 to shaft 13, preventing any axial movement along the axis of shaft 13. A key 29 engages a slot in the central bore of rotor 21 and in shaft 13 to lock rotor 21 for rotation with shaft 13. In this embodiment, the end of shaft 13 is tapered so that nut 27 will wedge rotor 21 onto shaft 13. However, a cylindrical end of shaft 13 could also be employed.

Brake assembly 11 also has a coil body 31, which is a cylindrical member spaced from mounting plate 15 along the axis of shaft 13. Coil body 31 in this embodiment is located on the rearward side of brake assembly 11 and has a central bore or cylinder 33 that is coaxial with the axis of shaft 13. A hydraulic passage 35 leads from cylinder 33 to the exterior for supplying hydraulic fluid pressure to cylinder 33. Rotor 21 is rotatable relative to coil body 31, and coil body 31 is capable of limited axial movement relative to rotor 21.

A piston 37 is carried reciprocally in cylinder 33 for movement along the axis of shaft 13. Piston 37 has a central cavity 39 on its forward side for accommodating nut 27. A seal 41 in cylinder 33 seals against the exterior cylindrical side wall of piston 37. Piston 37 has an annular brake flange 43 that extends radially outward. Brake flange 43 of this embodiment is a separate plate that is secured by fasteners 45 to piston 37. However, brake flange 43 could also be integrally formed with piston 37. Brake flange 43 locates between rotor 21 and coil body 31. An annular brake pad 47 is fixed to brake flange 43 for engaging brake surface 25. Pad 47 could alternately be secured to rotor 21 for rotation therewith rather than to brake flange 43. Brake flange 43 and piston 37 are not rotatable relative to coil body 31.

A friction plate 49 is located between mounting plate 15 and the forward facing braking surface 23 of rotor 21. Friction plate 49 is stationarily mounted to coil body 31, thus moves axially with coil body 31 relative to mounting plate 15. Friction plate 49 is not rotatable and has a brake pad 51 mounted to it. Brake pad 51 similarly could be mounted to rotor 21 rather than friction plate 49.

The mounting components for body 31, piston flange 43 and friction plate 49 include a plurality of bolts 53 mounted around the periphery of coil body 31. Bolts 53 are located within adjustable spacers 55. Each spacers 55 has a threaded exterior for engaging threads in one of the holes formed in coil body 31. Each spacer 55 passes through piston brake flange 43 and abuts friction plate 49. Rotating threaded spacer 55 will adjust the distance between coil body 31 and friction plate 49. Bolts 53 are secured within threaded holes formed in friction plate 49. A plurality of adjustment nuts 57 are secured to friction plate 49. Adjustment nuts 57 can be rotated to protrude through friction plate 49 and contact mounting plate 15 to adjust the distance between friction plate 49 and mounting plate 15 in its most forward position.

Upon the application of hydraulic pressure to passage 35, piston 37 will be forced toward rotor 21, causing its pad 47 to engage braking surface 25. At the same time, the reaction of the hydraulic pressure in cylinder 33 causes movement of coil body 31 away from rotor 21, bringing along with it friction plate 49. Brake pad 51 of friction plate 49 engages forward braking surface 23 of rotor 21.

Figure 2:
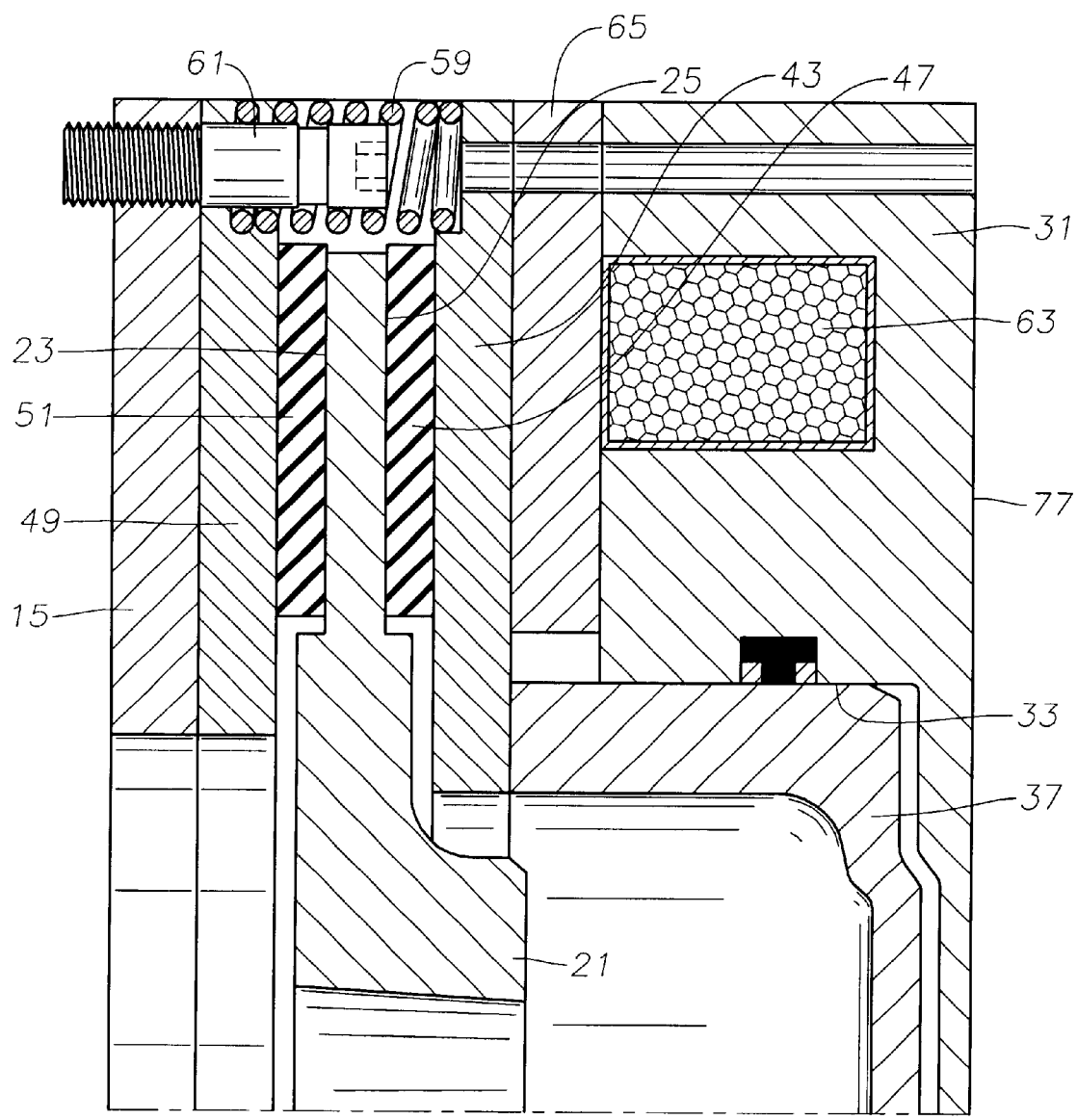
FIG. 2 is an enlarged partial cross-section view of the brake of FIG. 1, taken along the line 2—2 of FIG. 4.

Referring to FIG. 2, return springs 59 (only one shown) are employed to return piston brake flange 43 and friction plate 49 back to their non-braking positions when hydraulic pressure is relieved. Return springs 59 are spaced around the periphery brake assembly 11 just outward of the outer periphery of rotor 21. One end of each return spring 59 is located in a recess in friction plate 49 while the other end is located within a recess in piston brake flange 43. A shoulder screw 61 for each spring 59 maintains alignment. Shoulder screws 61 extend into threaded holes in mounting plate 15. Shoulder screws 61 do not prevent axial movement of friction plate 49 relative to mounting plate 15, but do prevent rotational movement.

Returning again to FIG. 1, an electromagnetic coil 63 is mounted in coil body 31. Coil 63 is annular and concentric with the axis of shaft 13. A coil plate 65 is mounted between coil body 31 and piston brake flange 43. Coil plate 65 is constructed of material that is attracted to coil 63 when electrical power is supplied to coil 63. Coil plate 65 has a central hole 67 that accommodates piston 37. Spacers 55 and fasteners 53 extend through holes in the outer periphery of coil plate 65, preventing any rotational movement of coil plate 65 relative to coil body 31. Coil plate 65, however, is able to move axially relative to coil body 31. A plurality of coil springs 69 (only one shown) are spaced around the axis of shaft 13. Coil springs 69 are located in cylindrical recesses in coil body 31. Each coil spring 69 engages a rearward side of coil plate 65, tending to push it away from coil body 31. When electrical power is supplied, the attraction caused by coil 63 will draw coil plate 65 into contact with coil body 31, compressing coil springs 69.

Electrical power is supplied while the vehicle is operating. Typically, a sensing and switch circuit is incorporated with the vehicle. When the operator leaves the seat of the vehicle, the switch is actuated to automatically remove the electrical power to coil 63. Springs 69 then push coil plate 65 toward rotor 21 by causing brake pad 47 of piston brake flange 43 to engage rearward braking surface 25 of rotor 21. At the same time, springs 69 move body 31 a short distance rearward along the axis, pulling friction plate 49 and its brake pad 51 into engagement with the forward brake surface 23 of rotor 21.

Figure 3:
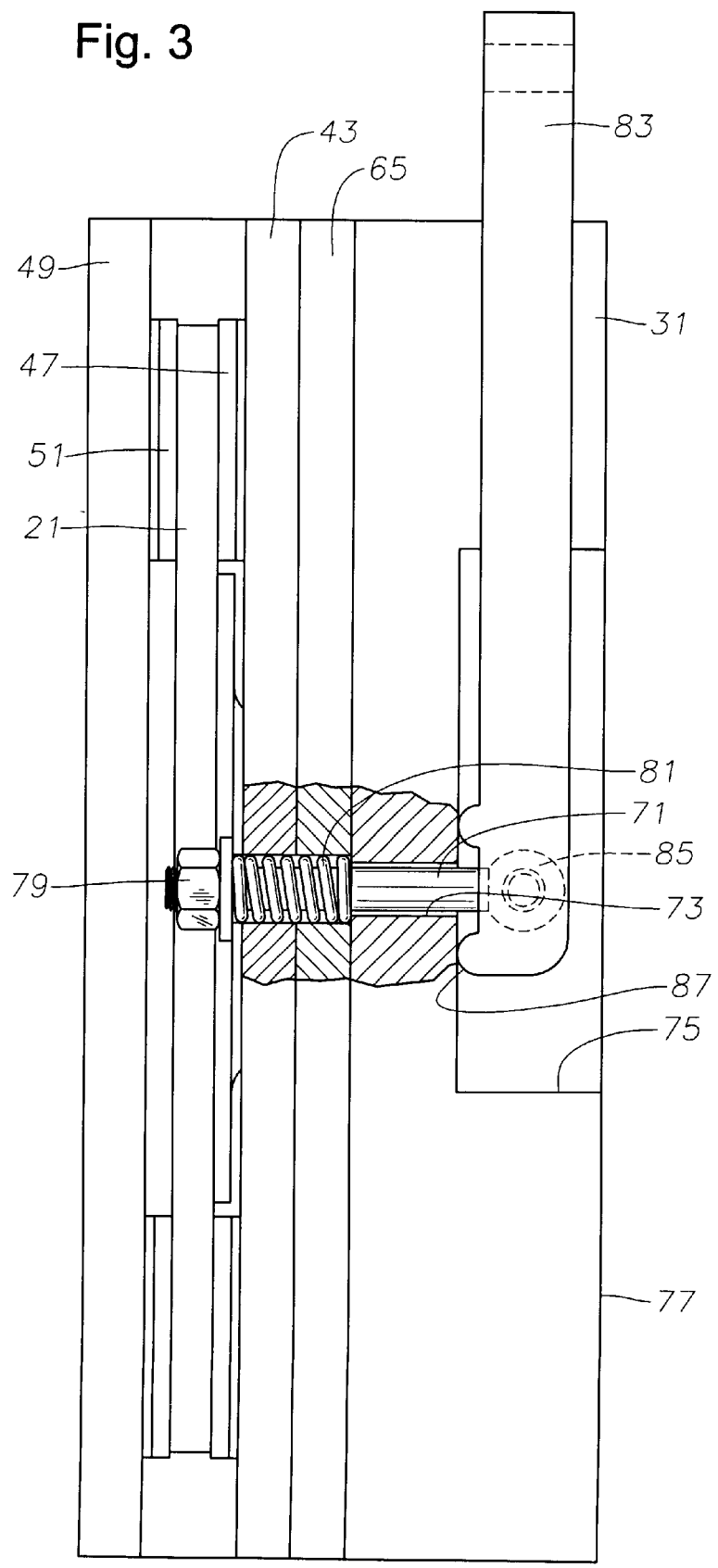
FIG. 3 is a partial cross-section view of the brake assembly of FIG. 1, taken along the line 3—3 of FIG. 4.
Figure 4:
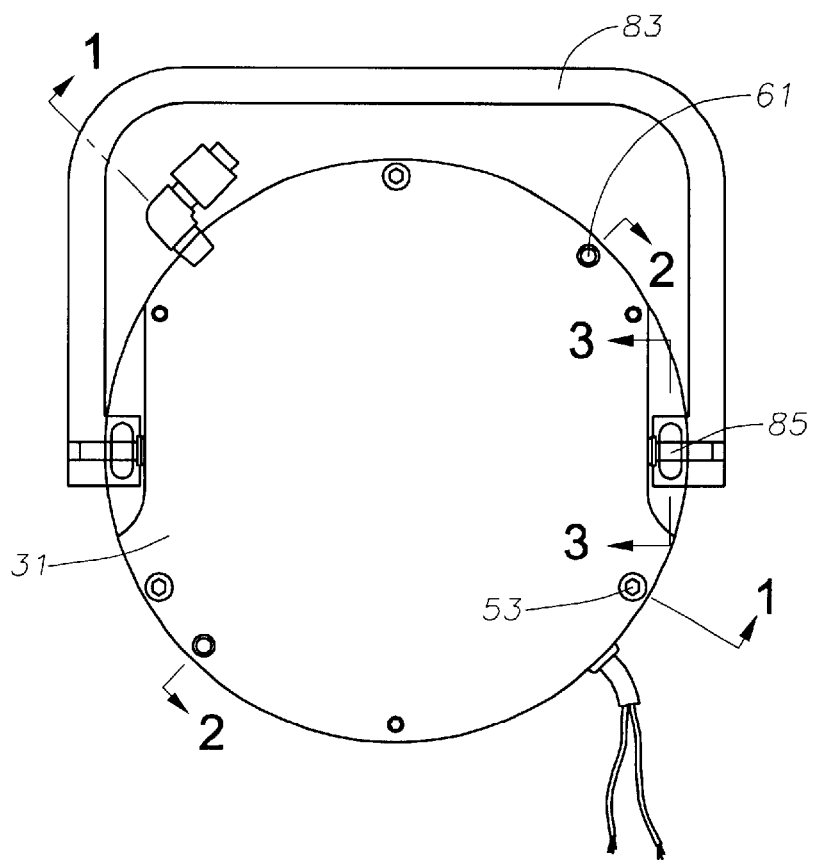
FIG. 4 is a rear view of the brake assembly of FIG. 1.
Figure 5:
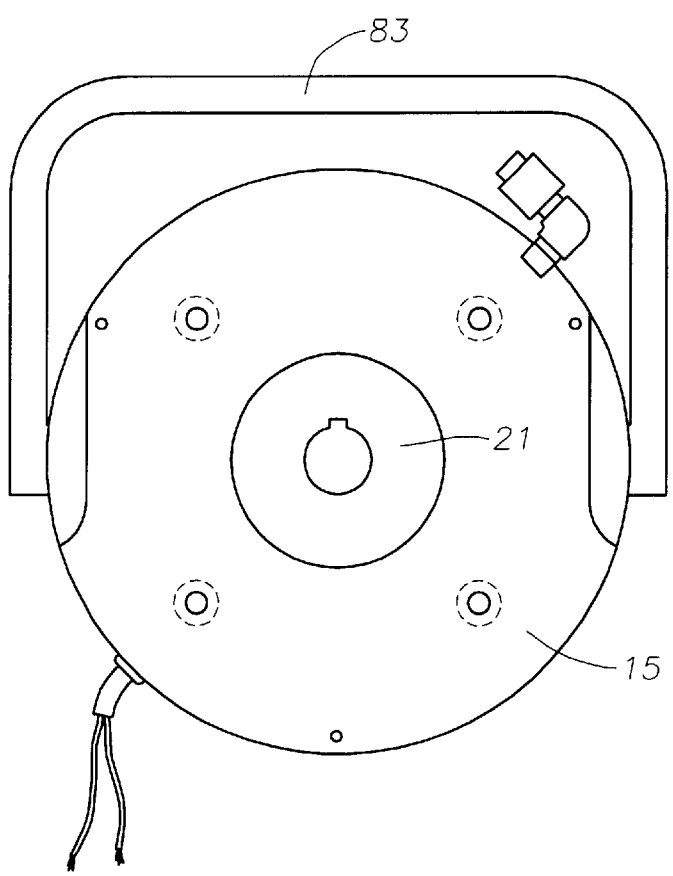
FIG. 5 is a front view of the brake assembly of FIG. 1.

It may be necessary to tow the vehicle in the event of an electrical power failure. An override mechanism exists to release the brake even though the electrical power is no longer passing to coil 63. As shown in FIG. 3, this mechanism includes a pair of release pins 71 (only one shown), each pin 71 being located at the periphery of coil body 31 and 180° apart from each other. Each release pin 71 is axially movable relative to an axis that is parallel to the axis of shaft 13. Each pin 71 passes through a hole 73 in coil body 31 with its rearward end located in a recess 75 formed on the rearward end 77 of coil body 31. Each pin 71 extends forward through brake flange 43. A nut 79 is located on the end of pin 71. A coil spring 81 is connected between nut 79 and coil body 31. A U-shaped lever, shown also in FIGS. 4 and 5, has each end connected to one of the pins 71 by a pivotal connection 85. Each end of lever 83 has a cam surface 87. Rotating lever 83 rearward about pivotal connections 85, pulls pins 71 rearward and along with it brake flange 43. Brake flange 43 presses coil plate 65 against coil springs 69 (FIG. 1), disengaging rotor 21 from both pads 51 and 47. This allows the vehicle to be towed.

In operation, during normal driving movement, hydraulic pressure is supplied through passage 35 each time the operator applies the brake. The hydraulic pressure pushes piston 37 to the left to force brake pad 47 against rearward braking surface 25. Simultaneously, the hydraulic pressure moves coil body 31 to the right, pulling friction plate 49 to the right and causing brake pad 51 to engage forward braking surface 23. When the operator releases the hydraulic brake pressure, return springs 59 (FIG. 2) push the brake flange 43 back to the right and friction plate 49 back to the left, freeing the rotor 21 for rotation.

Electrical power will be supplied to coil 63 at all times while the vehicle is operating. If electrical power ceases, which may be due to the operator turning the vehicle off or leaving the seat of the vehicle, then the brake will operate electrically. Upon the cessation of power to coil 63, springs 69 push plate 65 toward rotor 21, which in turn pushes brake flange 43 and its pad 47 into engagement with rearward brake surface 25. The reaction from springs 69 also pushes coil body 31 to the right, and pulls frictional plate 49 to the right along with it. This causes brake pad 51 of frictional plate 49 to engage forward braking surface 23.

The invention has significant advantages. The unit is compact and has few components. Solenoids and various linkages are not required to electrically actuate the brake. The same components that perform the hydraulic braking function will also perform the electric braking function.

While the invention has been shown in only one of its forms, it should be apparent to those skilled in the art that it is not so limited but is susceptible to various changes without departing from the scope of the invention. For example, it is not necessary that the piston be carried within a cylindrical bore in the coil body. A separate component can be used for the chamber for the hydraulic fluid pressure. While it is preferred to have braking surfaces on both sides of the rotor, braking action will occur if utilized only on one side. In that event, the frictional plate and its pad would not be required.

What is claimed is:

1. A brake assembly for a rotatable shaft of a vehicle, comprising:

a rotor for mounting to the shaft of the vehicle for rotation therewith, the rotor having an annular braking surface, the shaft having an axis;

a hydraulic piston axially movable relative to the rotor, the piston having a braking surface for frictionally engaging the braking surface of the rotor when hydraulic fluid pressure is supplied to the piston;

a coil body having an electromagnetic coil therein;

a coil plate axially moveable relative to the rotor, the coil plate being movable toward the coil body and away from the rotor in response to electrical power being supplied to the coil; and a coil spring mounted between the coil plate and the coil body that moves the coil plate away from the coil body and toward the rotor when the electrical power is removed from the coil, the coil plate being operatively engaged with the rotor to cause braking action preventing rotation of the rotor when the electrical power is removed from the coil;

wherein the coil plate is located between the braking surface of the piston and the coil body, such that the coil spring acting against the coil plate causes the coil plate to push the braking surface of the piston into engagement with the braking surface of the rotor when electrical power is removed from the coil.

2. The brake assembly according to claim 1, wherein:

the coil body has a cylinder in which the piston is carried and a hydraulic passage for receiving hydraulic fluid pressure, the coil body being axially movable relative to the rotor, such that movement of the piston toward the rotor due to hydraulic pressure being supplied causes the coil body to move away from the rotor.

3. The brake assembly according to claim 1, further comprising:
a mounting plate for stationarily mounting to the vehicle, the piston, the coil plate and the coil body being nonrotatably mounted to the mounting plate but axially moveable relative to the mounting plate.

4. The brake assembly according to claim 1, further comprising:
a manual override mechanism that selectively moves the coil plate back toward the coil body to release the braking action on the rotor even though electrical power has been removed from the coil.

5. The brake assembly according to claim 1, further comprising:
an axially movable pin extending from the coil body into the coil plate; and
a lever mounted to the coil body and pivotally connected with the pin, so that moving the lever to an override position causes the pin to move axially, pulling the coil plate toward the coil body to release the braking action.

6. A brake assembly for a rotatable shaft of a vehicle, comprising:
a rotor for mounting to the shaft of the vehicle for rotation therewith, the rotor having an annular braking surface, the shaft having an axis;
a hydraulic piston axially movable relative to the rotor, the piston having a braking surface for frictionally engaging the braking surface of the rotor when hydraulic fluid pressure is supplied to the piston;
a coil body having an electromagnetic coil therein;
a coil plate axially moveable relative to the rotor, the coil plate being movable toward the coil body and away from the rotor in response to electrical power being supplied to the coil;
a coil spring mounted between the coil plate and the coil body that moves the coil plate away from the coil body and toward the rotor when the electrical power is removed from the coil, the coil plate being operatively engaged with the rotor to cause braking action preventing rotation of the rotor when the electrical power is removed from the coil; and
a friction plate mounted stationarily to the coil body on an opposite side of the rotor from the braking surface of the piston, the friction plate having a braking surface that engages the rotor on the opposite side of the rotor when hydraulic pressure is supplied to the piston and also when electric power is removed from the coil.

7. A brake assembly for a rotatable shaft of a vehicle, comprising:
a rotor for mounting to the shaft of the vehicle for rotation therewith, the rotor having an annular braking surface, the shaft having an axis;
a hydraulic piston axially movable relative to the rotor, the piston having a braking surface for frictionally engaging the braking surface of the rotor when hydraulic fluid pressure is supplied to the piston;
a coil body having an electromagnetic coil therein;
a coil plate axially moveable relative to the rotor, the coil plate being movable toward the coil body and away from the rotor in response to electrical power being supplied to the coil, and
a coil spring mounted between the coil plate and the coil body that moves the coil plate away from the coil body and toward the rotor when the electrical power is removed from the coil, the coil plate being operatively engaged with the rotor to cause braking action preventing rotation of the rotor when the electrical power is removed from the coil; wherein:
the coil body has a cylinder in which the piston is carried and a hydraulic passage for receiving hydraulic fluid pressure, the coil body being axially movable relative to the rotor, such that movement of the piston toward the rotor due to hydraulic pressure being supplied causes the coil body to move away from the rotor; and wherein the brake assembly further comprises:
a friction plate mounted stationarily to the coil body on an opposite side of the rotor from the braking surface of the piston, the friction plate having a braking surface that engages the rotor on the opposite side of the rotor when the coil body moves away from the rotor.

8. A vehicle brake assembly, comprising:
a mounting plate for mounting to a stationary portion of a vehicle, the mounting plate having a hole for receiving a rotatable shaft of the vehicle;
a rotor for mounting to the shaft of the vehicle for rotation therewith, the rotor having annular first and second braking surfaces on opposite sides thereof;
a hydraulic piston axially moveable relative to the mounting plate, the piston having an annular braking flange facing the second braking surface of the rotor for frictionally engaging the second braking surface of the rotor when hydraulic fluid pressure is supplied to the piston;
a coil body carried by to the mounting plate, the braking flange of the piston being located between the coil body and the rotor, the coil body having an electromagnetic coil therein;
a coil plate axially moveable relative to the mounting plate and located between the coil body and the braking flange of the piston, the coil plate being movable toward the coil body and away from the rotor in response to electrical power being supplied to the coil;
a coil spring mounted between the coil plate and the coil body that moves the coil plate away from the coil body and toward the rotor when the electrical power is removed from the coil, the coil plate pressing the braking flange of the piston into engagement with the second braking surface of the rotor, preventing rotation of the rotor when the electrical power is removed from the coil; and
a friction plate connected stationarily to the coil body and located between the mounting plate and the first braking surface of the rotor, the coil body being axially movable relative to the mounting plate such that the coil spring pushes the coil body away from the rotor and pulls the friction plate into engagement with the first braking surface of the rotor when electrical power is removed from the coil.

9. The brake assembly according to claim 8, wherein the coil body has a cylinder in which the piston is carried and a hydraulic passage for receiving hydraulic fluid pressure, and wherein movement of the piston toward the rotor due to hydraulic pressure being supplied, causes the coil body to move away from the rotor and causes the friction plate to move into engagement with the first braking surface of the rotor.

10. The brake assembly according to claim 8, further comprising:

a manual override mechanism that selectively moves the coil plate back toward the coil body to release the engagement of the braking flange with the rotor even though electrical power has been removed from the coil.

11. The brake assembly according to claim 8, further comprising:

an axially movable pin extending from the coil body into engagement with the braking flange of the piston; and a lever mounted to the coil body and pivotally connected with the pin, so that moving the lever to an override position causes the pin the move axially, pulling the braking flange toward the coil body to allow rotation of the rotor even through electrical power has been removed from the coil.

12. A brake assembly for a rotatable shaft, comprising:

a mounting plate having a central hole for receiving a rotatable shaft;

a rotor for mounting to the shaft for rotation therewith, the rotor having an annular braking surface;

a coil body mounted to the mounting plate and having an electromagnetic coil therein, the coil body having a central bore coaxial with an axis of the rotor and a hydraulic passage leading therefrom;

a hydraulic piston reciprocally carried in the central bore, the piston having an annular braking flange for frictionally engaging the braking surface of the rotor when hydraulic fluid pressure is supplied to the cylinder through the hydraulic passage;

a coil plate between the coil body and the braking flange of the piston, the coil plate being movable toward the coil body and away from the rotor in response to electrical power being supplied to the coil; and a coil spring mounted between the coil plate and the coil body that moves the coil plate away from the coil body and toward the rotor when the electrical power is removed from the coil, the coil plate pressing the braking flange of the piston into engagement with the second braking surface of the rotor, preventing rotation of the rotor when the electrical power is removed from the coil.

13. The brake assembly according to claim 12, further comprising:

a friction plate connected stationarily to the coil body and located between the mounting plate and the rotor on an opposite side from the piston, the coil body being axially movable relative to the mounting plate such that the coil spring pushes the coil body away from the rotor and pulls the friction plate into engagement with the rotor when electrical power is removed from the coil, and also hydraulic pressure supplied to the cylinder moves the coil body away from the rotor and pulls the friction plate into engagement with the rotor.

14. The brake assembly according to claim 12, further comprising:

a manual override mechanism that selectively moves the coil plate back toward the coil body to release the engagement of the braking flange with the rotor even though electrical power has been removed from the coil.

15. The brake assembly according to claim 12, further comprising:

a plurality of axially movable pins offset from the axis of the rotor and extending from the coil body into engagement with the braking flange of the piston; and a lever mounted to an end surface of the coil body and pivotally connected with the pins, the lever having a cam surface, so that pivotally rotating the lever to an override position causes the pins to move axially, pulling the braking flange toward the coil body to allow rotation of the rotor even through electrical power has been removed from the coil.

\* \* \* \* \*